United States Patent
Rashkin et al.

(10) Patent No.: US 12,500,415 B1
(45) Date of Patent: Dec. 16, 2025

(54) SOLID-STATE TRANSFORMER FOR MITIGATION OF COMMON MODE INSULTS

(71) Applicant: National Technology & Engineering Solutions of Sandia, LLC, Albuquerque, NM (US)

(72) Inventors: Lee Joshua Rashkin, Albuquerque, NM (US); Timothy James Donnelly, Albuquerque, NM (US); David Wilson, Tijeras, NM (US); Ronald Craig Matthews, Jr., Albuquerque, NM (US); Steven F. Glover, Albuquerque, NM (US); Kyle Jackson Goodrick, Salt Lake City, UT (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 18/929,917

(22) Filed: Oct. 29, 2024

Related U.S. Application Data (60) Provisional application No. 63/594,988, filed on Nov. 1, 2023.

(51) Int. Cl.
| | |
|---|---|
| *H02J 3/00* | (2006.01) |
| *H02M 3/335* | (2006.01) |
| *H02M 7/217* | (2006.01) |
| *H02M 7/537* | (2006.01) |

(52) U.S. Cl.
CPC ......... *H02J 3/001* (2020.01); *H02M 3/33573* (2021.05); *H02M 7/217* (2013.01); *H02M 7/537* (2013.01)

(58) Field of Classification Search
CPC .... H02J 3/001; H02M 3/33573; H02M 7/217; H02M 7/537
USPC .......................................................... 307/31
See application file for complete search history.

(56) References Cited

U.S. PATENT DOCUMENTS

| | | | | |
|---|---|---|---|---|
| 2014/0225440 | A1* | 8/2014 | Oswald | H02M 1/12 307/52 |
| 2017/0085124 | A1* | 3/2017 | Ho | H02J 7/0068 |
| 2021/0376753 | A1* | 12/2021 | Liu | H02M 7/2173 |

OTHER PUBLICATIONS

Donnelly, T. and Rashkin, L. "A Solid State Transformer for Electric Power Grid HEMP/GMD Mitigation," 2023 IEEE 24th Workshop on Control and Modeling for Power Electronics, 2023, (COMPEL), pp. 1-6.
Kappenman, J. G. et al., "GIC Mitigation: A Neutral Blocking/Bypass Device to Prevent the Flow of GIC in Power Systems," IEEE Transactions on Power Delivery, 1991, vol. 6, pp. 1271-1281.
(Continued)

*Primary Examiner* — Richard Tan
(74) *Attorney, Agent, or Firm* — Kevin W. Bieg (57) ABSTRACT

A high altitude electromagnetic pulse (HEMP) or other similar geomagnetic disturbance (GMD) has the potential to severely impact the operation of large-scale electric power grids by introducing low-frequency common-mode (CM) currents which deteriorate the performance of key grid components, such as large power transformers. A solid-state transformer (SST) can replace susceptible equipment and improve grid resiliency by safely redirecting, absorbing, and/or converting these CM insults.

5 Claims, 11 Drawing Sheets

(56) References Cited

OTHER PUBLICATIONS

Perales, M. A. et al., "Three-Dimensional Space Vector Modulation in abc Coordinates for Four-Leg Voltage Source Converters," IEEE Power Electronics Letters, 2003, vol. 1, pp. 104-109.

She, X. et al., "Review of Solid-State Transformer Technologies and Their Application in Power Distribution Systems," IEEE Journal of Emerging and Selected Topics in Power Electronics, 2013, vol. 1, pp. 186-196.

Zhang, R. et al., "Three-Dimensional Space Vector Modulation for Four-Leg Voltage-Source Converters," IEEE Transactions on Power Electronics, 2002, vol. 17, pp. 314-326.

Zhao, B. et al., "Overview of Dual-Active-Bridge Isolated Bidirectional DC-DC Converter for High-Frequency-Link Power-Conversion System", IEEE Transactions on Power Electronics, 2014, vol. 29, pp. 4091-4106.

\* cited by examiner

SOLID-STATE TRANSFORMER FOR MITIGATION OF COMMON MODE INSULTS

CROSS-REFERENCE TO RELATED APPLICATION

This application claims the benefit of U.S. Provisional Application No. 63/594,988, filed Nov. 1, 2023, which is incorporated herein by reference.

FEDERALLY SPONSORED RESEARCH AND DEVELOPMENT

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosure is submitted under 35 U.S.C. 102(b)(1)(A): Timothy Donnelly and Lee Rashkin, "A Solid State Transformer for Electric Power Grid HEMP/GMD Protection," in 2023 IEEE 24$^{th}$ Workshop on Control and Modeling for Power Electronics (COMPEL), pp. 1-6 (2023). The subject matter of this disclosure was conceived of or invented by the inventors named in this application.

BACKGROUND OF THE INVENTION

Today a variety of both man-made and natural events threaten the reliable operation of the electric power grid, including threats posed by high altitude electromagnetic pulses (HEMP) and solar-geomagnetic disturbances (GMD). See H. M. Pennington et al., Proc. IEEE 109 (4), 315 (2021); J. Kappenman, IEEE Power Eng. Rev. 16 (5), 5 (1996); and P. Price, IEEE Trans. Power Del. 17 (4), 1002 (2002). These events can impact electrical grids by inducing low-frequency common-mode (CM) currents which couple to the grid through long transmission lines and return to earth through grounded power transformers. The geomagnetically induced currents (GICs) which result from these events can cause the magnetic cores of transformers to become saturated, leading to distorted ac waveforms, increased losses, and the potential for transformer damage, cascading blackouts, and other system instabilities. See J. Kappenman, IEEE Power Eng. Rev. 16(5), 5 (1996); and P. Price, IEEE Trans. Power Del. 17(4), 1002 (2002).

In the past, a variety of approaches for minimizing the impact of GICs on power system operation have been investigated, including passive blocking devices, corrective line switching, and, more recently, using active devices to disrupt GICs in the transformer neutral. See J. Kappenman et al., IEEE Trans. Power Del. 6(3), 1271 (1991); M. Lu, H. Nagarajan et al., IEEE Trans. Power Syst. 33(3), 2539 (2018); M. Kazerooni et al., IEEE Trans. Power Syst. 33(3), 2563 (2018); B. Kovan and F. de Leon, IEEE Trans. Power Del. 30(4), 1999 (2015); and M. Nazir et al., IEEE Trans. Power Del. 36(4), 2542 (2021). At the same time, solid-state transformers (SSTs) have emerged as a technology that aims to supplant conventional magnetic transformers with designs based on modern solid-state switching devices and power conversion circuits. See X. She et al., IEEE J. Emerg. Sel. Top. Power Electron. 1(3), 186 (2013). A SST is actually an ac-to-ac converter that can actively regulate voltage and current. Because of the flexibility afforded by power electronics to quickly and accurately control power flows, SSTs are envisioned to enable a new avenue for increased reliability, resiliency, efficiency, flexibility, and security of the electric power grid. See Solid State Power Substation Technology Roadmap, U.S. DOE Office of Electricity Transformer Resilience and Advanced Components (TRAC) Program (2020).

SUMMARY OF THE INVENTION

The present invention is directed to a solid-state transformer for mitigation of common mode insults, comprising a primary-side ac/dc converter on a grid side, an intermediate dc/dc converter electrically connected in series to the output of the primary-side ac/dc converter which provides galvanic isolation of the grid side and a load side, thereby enabling large step-up/step-down ratios, a secondary-side dc/ac converter electrically connected in series to an output of the intermediate dc/dc converter and configured to feed a downstream load, an energy storage system electrical connected in parallel to the output of the primary-side ac/dc converter and configured to absorb common mode energy incident on the grid side, and a controller configured to divert common mode energy to the energy storage device and output enough power from primary-side ac/dc converter to ensure the secondary-side dc/ac converter outputs a constant current to a downstream load. The primary-side ac/dc converter and the secondary-side dc/ac converter can be four-legged converters. The intermediate dc/dc converter can comprise a dual active bridge. For example, the energy storage system can comprise a battery, super capacitor, or flywheel.

The SST is able to control the CM component of ac grid currents. This next-generation solid-state transformer is intended to replace existing grid infrastructure which today is susceptible to both naturally occurring and man-made CM insult threats. The power electronics and controls architecture of the SST and simulation results of the SST responding to a CM insult are described below.

BRIEF DESCRIPTION OF THE DRAWINGS

The detailed description will refer to the following drawings, wherein like elements are referred to by like numbers.

FIGS. 10A-10C illustrate grid-side dynamic behavior of the SST in response to CM voltage insult. A feedback PID regulator returns the CM current to zero after a brief transient. FIGS. 10D-10F illustrate DC and output dynamic behavior of the SST in response to CM voltage insult. Current supplied to ESS temporarily increases as energy from CM insult is transferred to the dc-side of the ac/dc converter.

DETAILED DESCRIPTION OF THE INVENTION

Figure 1:
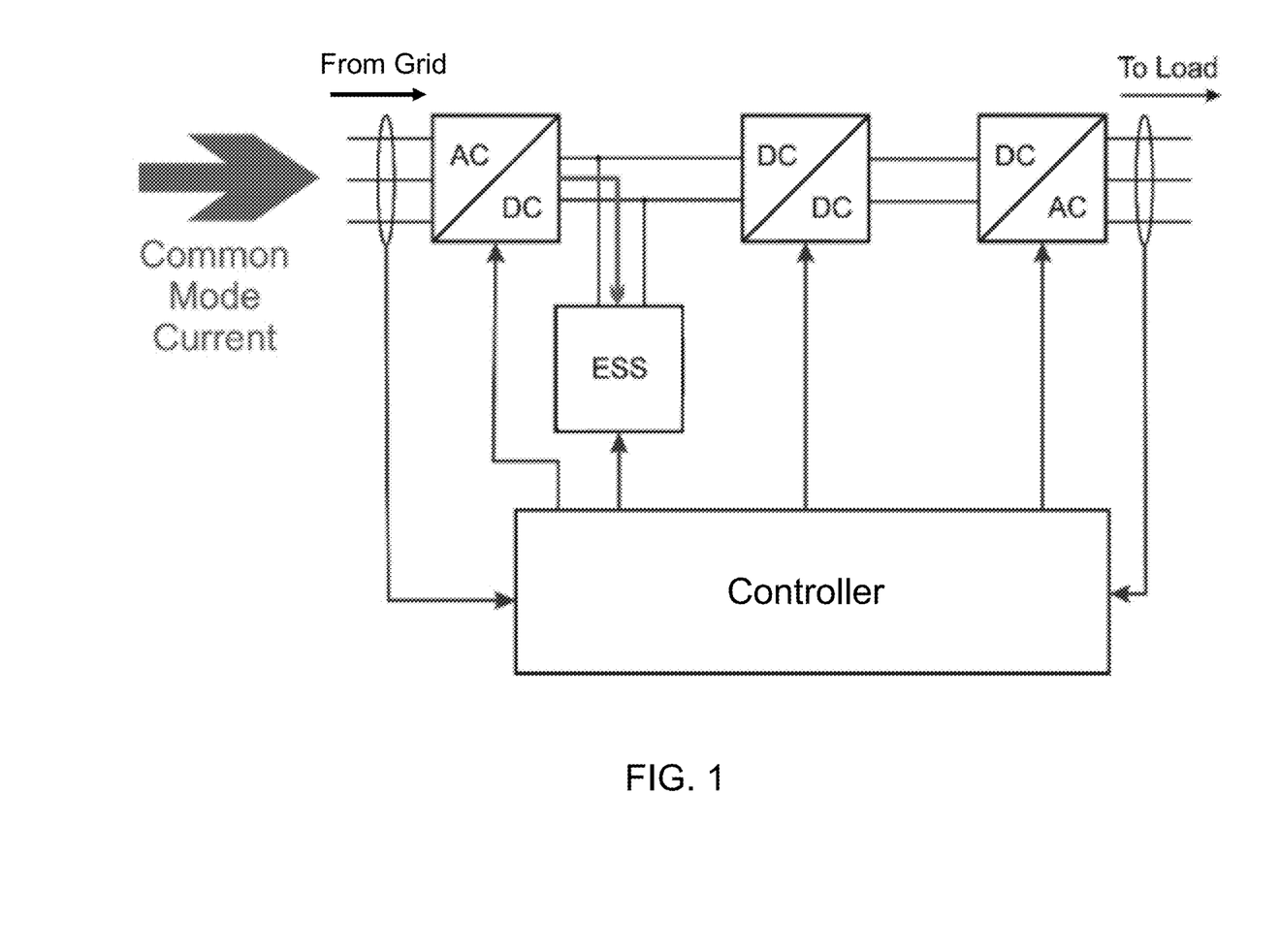
FIG. 1 is a block diagram of a solid-state transformer (SST) designed to neutralize common-mode insults.

The present invention is directed to a solid-state transformer (SST) which specifically addresses the weaknesses of conventional transformers to low-frequency common-mode (CM) insults, and instead is made immune to the threat of a potential HEMP/GMD event by using a unique power electronic and control architecture. A block diagram of the SST is shown in FIG. 1. The SST comprises a primary-side ac/dc converter (i.e., an ac/dc rectifier) on the grid side, an intermediate dc/dc converter which provides galvanic isolation and enables large step-up/step-down ratios, and a secondary-side dc/ac converter (i.e., a dc/ac inverter) configured to feed downstream loads. Because of the three-stage ac/dc/ac topology, this SST is labeled a Type 4 converter. See J. Kappenman et al., *IEEE Trans. Power Del.* 6(3), 1271 (1991). In additional to the standard Type 4 components, the SST illustrated in FIG. 1 includes an energy storage system (ESS). The converters are designed to control the power flow into into/out of the SST, as well as control the flow of unintended low frequency CM currents. By controlling CM current on the grid side of the SST, and by utilizing the ESS to absorb the incident CM energy, the SST can be made immune to the insult while still maintaining the nominal input/output behavior of the transformer during a HEMP/GMD event. This desirable behavior is demonstrated via simulation of an exemplary SST useful for power system HEMP/GMD protection.

Half-Cycle Saturation in a Conventional Magnetic Transformer

In conventional ac power systems, the main purpose of a transformer to transfer energy from a primary set of windings at a particular voltage and current level, to a secondary set of windings at a typically higher (step-up) or lower (step-down) voltage/current level. This energy is transferred via the magnetic core of a conventional transformer, which therefore necessitates the magnetic flux of the core to be a time-varying signal. Assuming ideal behavior, the transformer functions as a linear mutual inductance between the two windings, and thus for a 60 Hz system, the flux would be a 60 Hz sinusoidal waveform. In practice, the magnetic core exhibits several non-ideal behaviors, including the non-linear phenomenon of magnetic saturation for large flux values.

Half-cycle saturation in a magnetic transformer occurs when an offset in the magnetic flux results in the core of the transformer becoming saturated during parts of the ac cycle when the offset and time-varying component add constructively. A schematic illustration of half-cycle saturation in a magnetic core is shown in FIG. 2, which shows the difference between a magnetic flux with and without an offset, and how the corresponding magnetizing current is distorted (3) for a half-cycle as a result of saturation.

Figure 2:
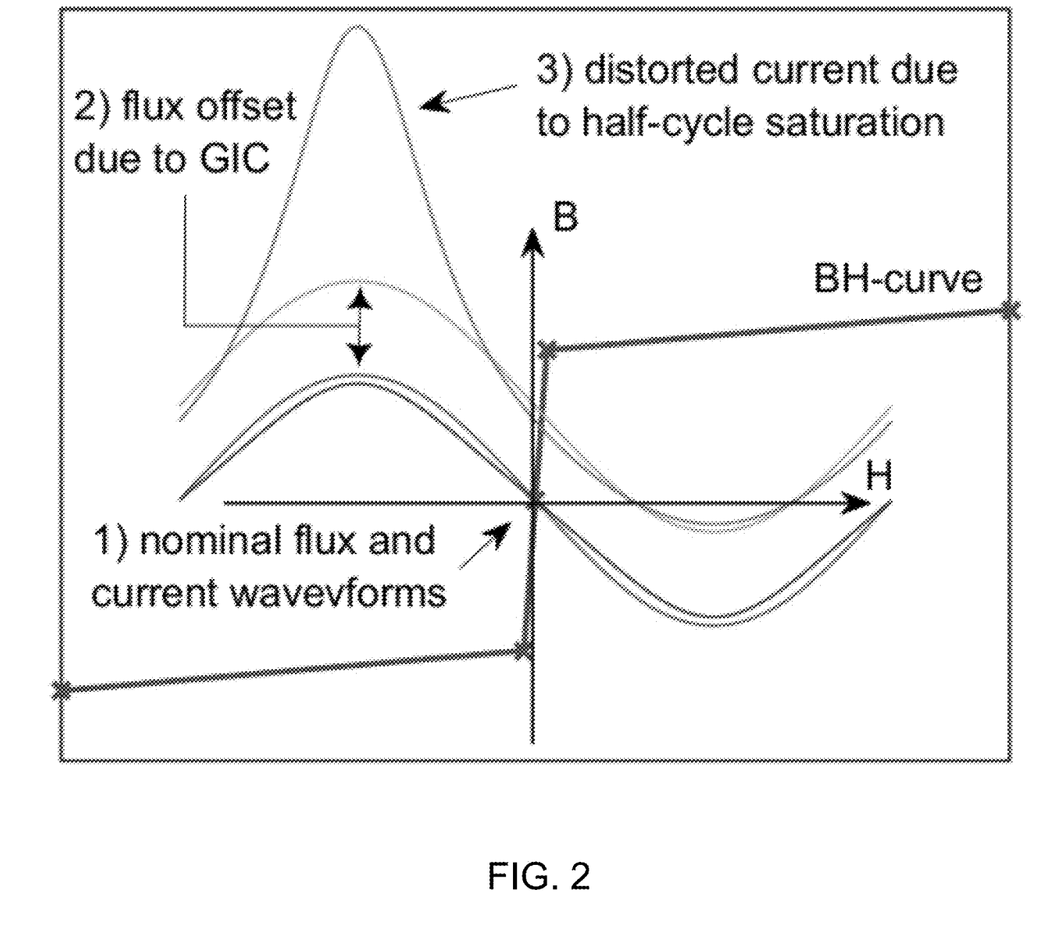
FIG. 2 is an illustration of half-cycle saturation in a magnetic core due to a dc offset in flux, resulting in a distorted current waveform.
Figure 3:
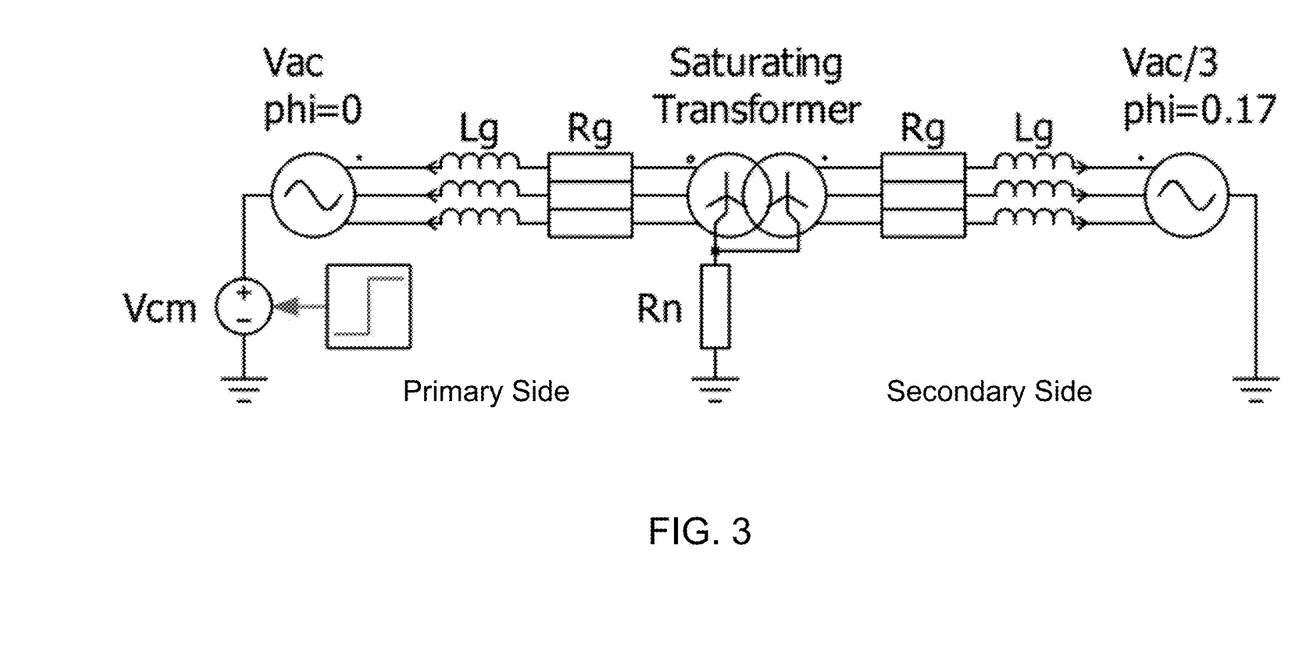
FIG. 3 is a circuit diagram of a simulation of a conventional magnetic transformer subjected to a CM voltage insult.

Although there are potentially a variety of reasons why a flux offset can exist in the core, as shown in FIG. 2, for power system operators one of the major concerns is that an offset can develop as a result of a low-frequency GIC. In order to demonstrate this phenomenon, and to serve as a comparison to the SST of the present invention, a CM insult impacting a conventional magnetic transformer was simulated. A schematic of the simulated circuit is shown in FIG. 3. Included are the primary- and secondary-side three-phase voltage sources $Va_c$ and $V_{ac}/3$, primary- and secondary-side line impedances $L_g$ and $R_g$, a ground resistance $R_n$, the saturating transformer itself, and finally a simulated CM voltage insult $V_{cm}$, modeled with a step-function. The parameters of the simulated circuit are shown in Table I.

TABLE I

Grid and saturating transformer parameters.

| $V_{ac}$ [$V_{rms}$] | $V_{cm}$ [V] | $R_g$ [Ω] | $L_g$ [mH] | $R_n$ [Ω] | $I_m$ p.u. | $\phi_m$ p.u. |
|---|---|---|---|---|---|---|
| 230 | 200 | 0.5 | 1.4 | 5 | {0, 0.0024, 1} | {0, 1.2, 1.52} |

Figure 4A:
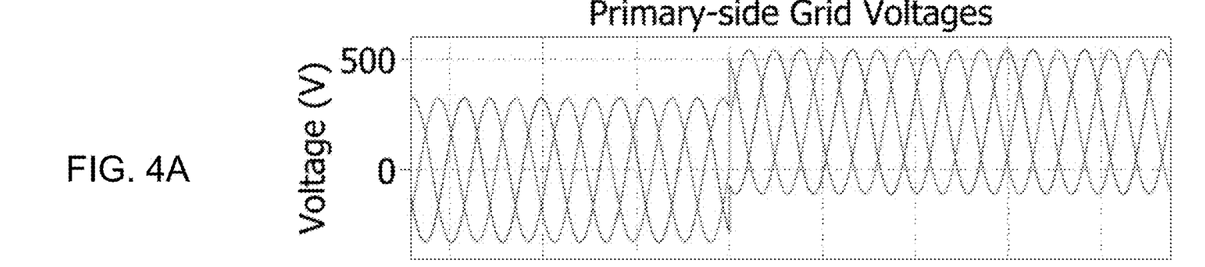
FIGS. 4A-4C show simulation results illustrating half-cycle saturation of a conventional magnetic transformer in response to a CM voltage insult.
Figure 4B:
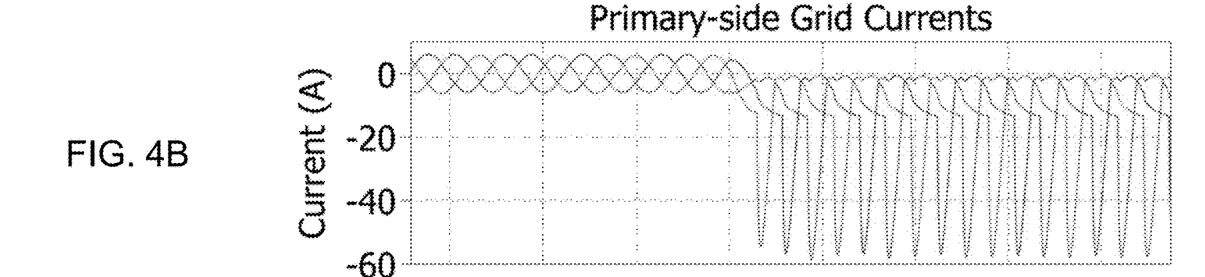
Figure 4C:
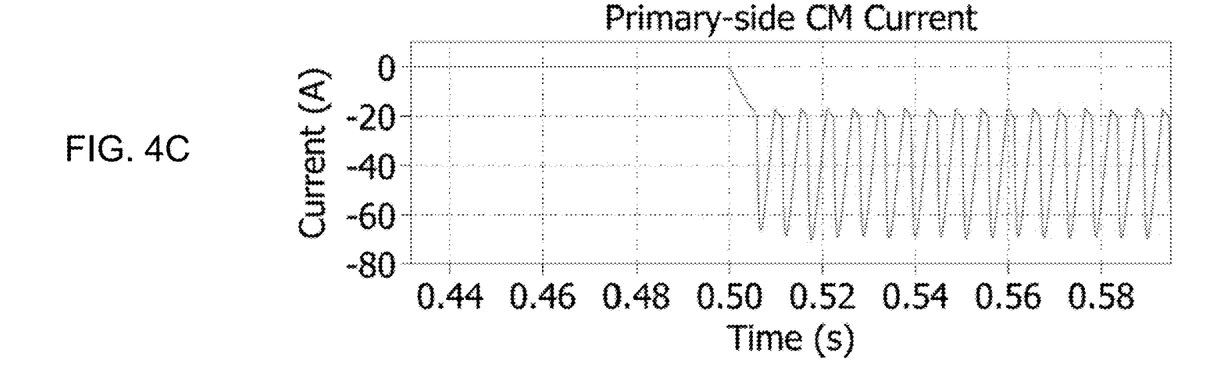

The simulation results for the conventional transformer subjected to a CM voltage insult are shown in FIGS. 4A-4C, including the primary-side grid voltages and currents, and the corresponding primary-side CM current. CM current is defined as the average of the phase currents:

$$i_{cm} = i_0 = \frac{i_a + i_b + i_c}{3} \quad (1)$$

which is equivalent to the zero-sequence component in the dq0 rotating reference frame. See P. C. Krause et al., *Analysis of electric machinery and drive systems*, Wiley (2013). Before the CM insult, the primary-side grid voltages and currents are sinusoidal signals with no dc offset. The CM current is zero, since in normal operation the phase currents are all phase-shifted by 120 degrees, and thus $i_{cm}$ in Eq. (1) is zero.

At t=0.5 s, a simulated CM insult of 200 V (~½ the line-neutral ac voltage) starts and correspondingly the primary-side grid voltages immediately increase due to the CM dc offset, as shown in FIG. 4A. This applied CM voltage source also begins to cause a CM current to flow, as shown in FIG. 4C, running through the transformer primary-side winding and returning through $R_n$. This CM current pushes the transformer into a region of half-cycle saturation, which results in the distorted primary-side grid current shown in FIG. 4B. Although a complete analysis of impact that these distorted currents would have on system performance, including impact on protection schemes, voltage stability, reactive power draws and transformer thermal behavior, were not considered, it is clear the CM insult has significant impact on the conventional magnetic transformer. See *Geomagnetic disturbances (gmd) impacts on protection systems*, Power System Relaying and Control Committee, Working Group K17; Z. M. K. Abda et al., *IEEE Access* 8, 200 237 (2020); and "Magnetohydrodynamic electromagnetic pulse assessment of the continental U.S. electric grid: Geomagnetically induced current and transformer thermal analysis," EPRI, 2017.

Solid-State Transformer Architecture

The SST of the present invention is designed to overcome the susceptibility of magnetic core transformers to low-frequency CM insults and remove them from the power system while still maintaining the step-up/step-down ac/ac conversion capability of conventional transformers.

Four-Leg Converter

Traditionally, a three-phase, three-leg converter is used in grid applications. This circuit design enables control over the AC components of the waveforms—d and q in the dq0 frame of reference. See P. C. Krause et al., *Analysis of electric machinery and drive systems*, Wiley (2013). However, this circuit architecture does not allow for full control over the zero-sequence component, which for current waveforms is defined as the average of the phase currents, according to Equation (1). See M. Llonch-Masachs et al., "Understanding the three and four-leg inverter Space Vector," in 2016 *18th European Conference on Power Electronics and Applications (EPE'16 ECCE Europe)*, (2016).

Figure 5:
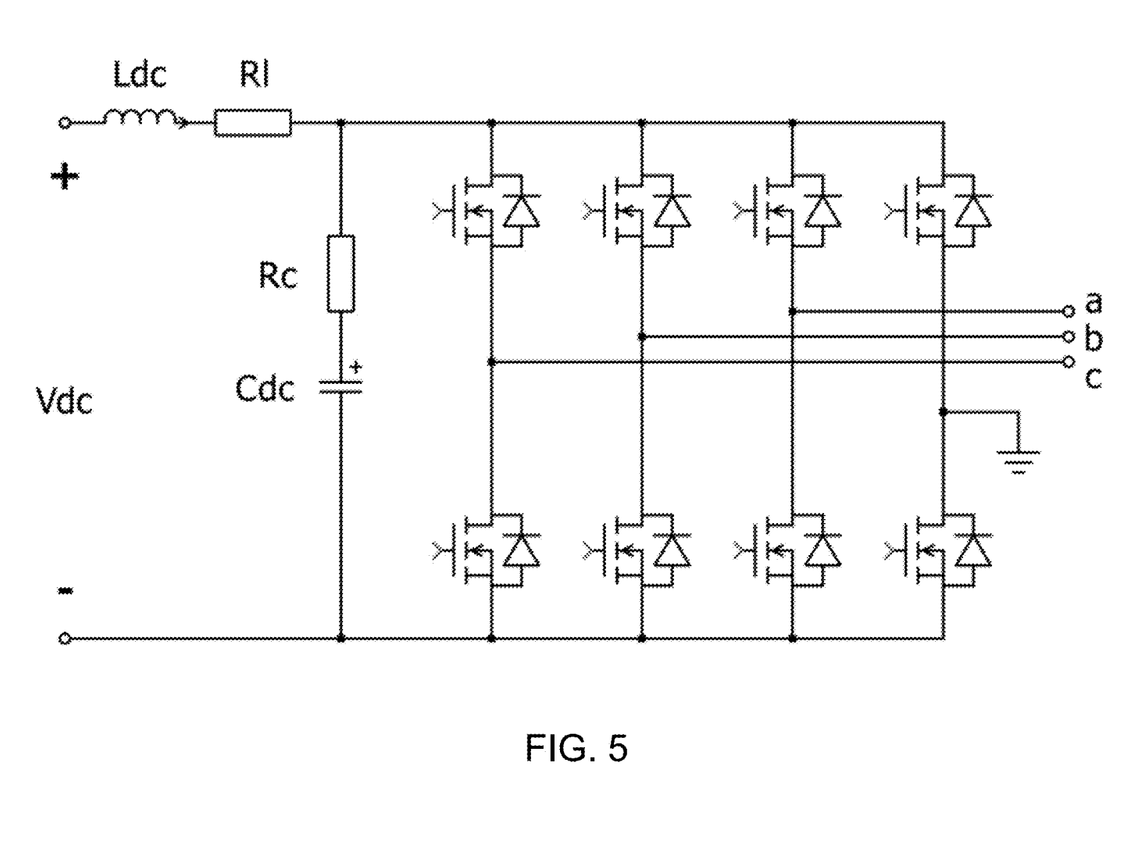
FIG. 5 is a circuit diagram for a four-leg converter.

One of the key contributions of the SST the present invention is the utilization of a four-legged converter for the voltage/current conversion instead of the standard three-leg converter. By adding an additional phase-leg, not only can the four-leg converter control the standard dq component of the phase currents, but it can also control the zero-sequence (CM) component. See M. Llonch-Masachs et al., "Understanding the three and four-leg inverter space vector," in 2016 18th European Conference on Power Electronics and Applications (EPE'16 ECCE Europe), 2016, pp. 1-10. In other words, while a three-leg converter is typically used to control the direct, quadrature voltage/current, a four-leg converter can control the direct (d), quadrature (q) and zero-sequence components. An illustration of the four-leg dc/ac converter is shown in FIG. 5, which includes a de filter inductor and capacitor, four MOSFET half-bridge phase legs, and a four-wire output connection. The mid-point of the fourth-phase leg is grounded. This enables either the upper or lower dc rail to be connected to ground depending on the switch state, and enables a net non-zero three-phase current to flow into/out-of the converter and return through ground. The converter can also include an ac filter (not shown) on the output side. The parameters for an exemplary four-leg converter system used in the simulations are shown in Table II.

TABLE II

Four-leg converter parameters.

| $L_{dc}$ [mH] | $R_l$ [Ω] | $C_{dc}$ [mF] | $R_c$ [mΩ] | $F_{sw}$ [kHz] |
|---|---|---|---|---|
| 1 | 0.1 | 5 | 10 | 20 |

Figure 6:
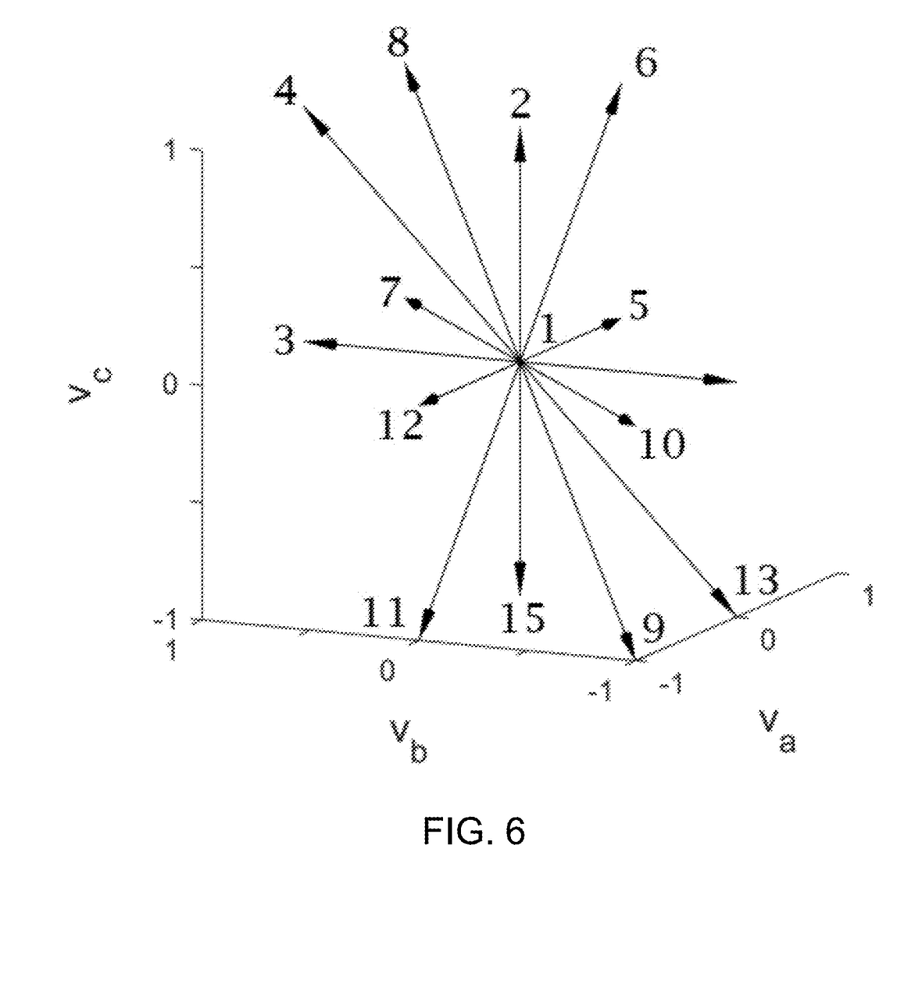
FIG. 6 illustrates possible switching states of a four-leg converter in abc coordinates. See M. Perales et al., IEEE Power Electron. Lett. 1(4), 104 (2003).

Because of the addition of the fourth phase-leg, standard space vector pulse-width modulation (SVM) is not applicable. A 3D-SVM scheme is required instead. See R. Zhang et al., *IEEE Trans. Power Electron.* 17(3), 314 (2002). The 3D-SVM described in Perales et al. can be used to control the four-leg converter shown in FIG. 5. See M. Perales et al., *IEEE Power Electron. Lett.* 1(4), 104 (2003). An illustration of various switch states and their corresponding voltage in abc coordinates is shown in FIG. 6. It is recalled that in standard 2D-SVM, there are 8 possible switch states, and the three-leg converter can be made to output, on average, any voltage vector in a circularly bounded region of the dq-plane by correspondingly varying the time spent at each switch state in a pulse-width modulation (PWM) type manner. See B. Zhao et al., *IEEE Trans. Power Elec.* 29(8), 4091 (2014). The same approach applies for 3D-SVM, however, with a four-leg converter any voltage vector in a bounded 3D region can be obtained. Like the standard 2D-SVM, where switch states are typically illustrated as vertexes of a hexagon in a plane, FIG. 6 analogously shows the switching states as vertexes of dodecahedron for a 3D-SVM.

Dual Active Bridge and Energy Storage System

Figure 7:
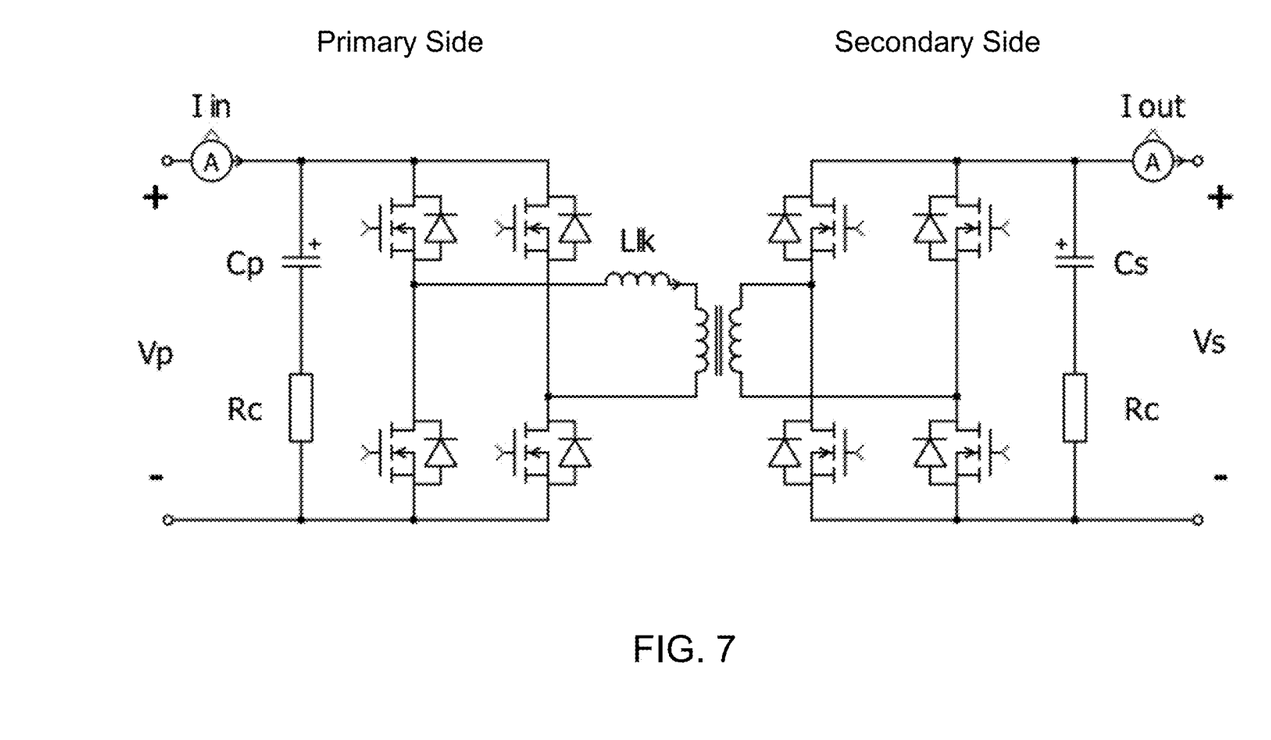
FIG. 7 is a circuit diagram for a dual-active bridge (DAB) isolated dc/dc converter that provides galvanic isolation and step-up/down ratio for the SST.

Besides the four-legged ac/dc and dc/ac converters, the SST also consists of an isolated dc/dc converter and an energy storage system (ESS). The dc/dc converter can be a dual-active bridge (DAB), which primarily consists of a high-frequency transformer between two full bridge converters. The DAB provides galvanic isolation between the two halves of the SST and enables the SST to have large step-up/down voltage ratios. A circuit diagram of the DAB is shown in FIG. 7. The two converters operate with a constant 50% duty cycle, and an adjustable time-delay (phase-shift) between the respective switching signals of each converter enables the power through the transformer to be controlled. See B. Zhao et al., *IEEE Trans. Power Electron.* 29(8), 4091 (2014). The simulated transformer has a turns ratio of 4:1. The other circuit parameters for the exemplary DAB used in the simulations are provided in Table III.

Figure 8:
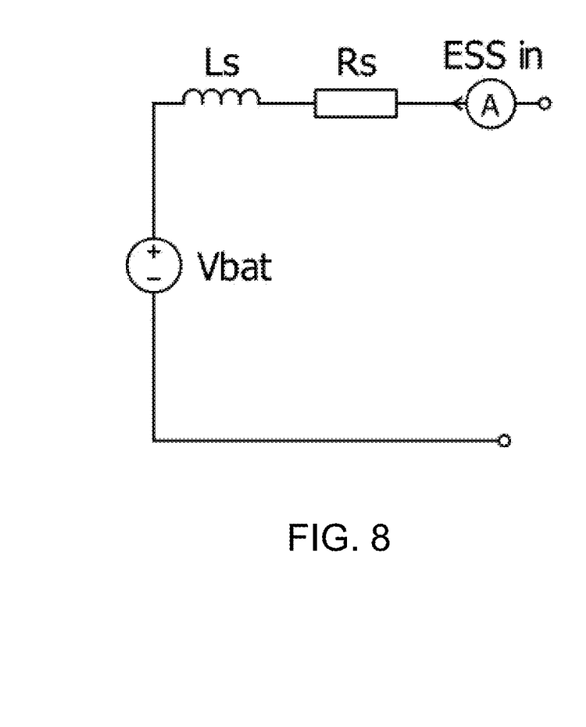
FIG. 8 is a circuit diagram for an energy storage system (ESS).

The ESS in the SST plays a key role in ensuring that during a CM insult, the nominal dq behavior of the overall ac/ac converter remains unaffected. Although in practice any physical ESS will likely have its own (potentially complex) dynamic behavior, for simplicity the ESS was modeled using an ideal voltage source Vbat behind an RL filter, as shown in FIG. 8. In general, the ESS can comprise any appropriate energy storage device, such as a battery, super capacitor, flywheel, etc. The parameters of the exemplary ESS are also listed in Table III.

TABLE III

DAB and ESS parameters.

| DAB | | | | ESS | | |
|---|---|---|---|---|---|---|
| $C_p$, $C_s$ [mF] | $L_{lk}$ [µH] | $R_c$ [mΩ] | $F_{sw}$ [kHz] | $V_{bat}$ [V] | $L_s$ [µH] | $R_s$ [Ω] |
| 5 | 20 | 10 | 100 | 700 | 100 | 0.1 |

Controller

Figure 9:
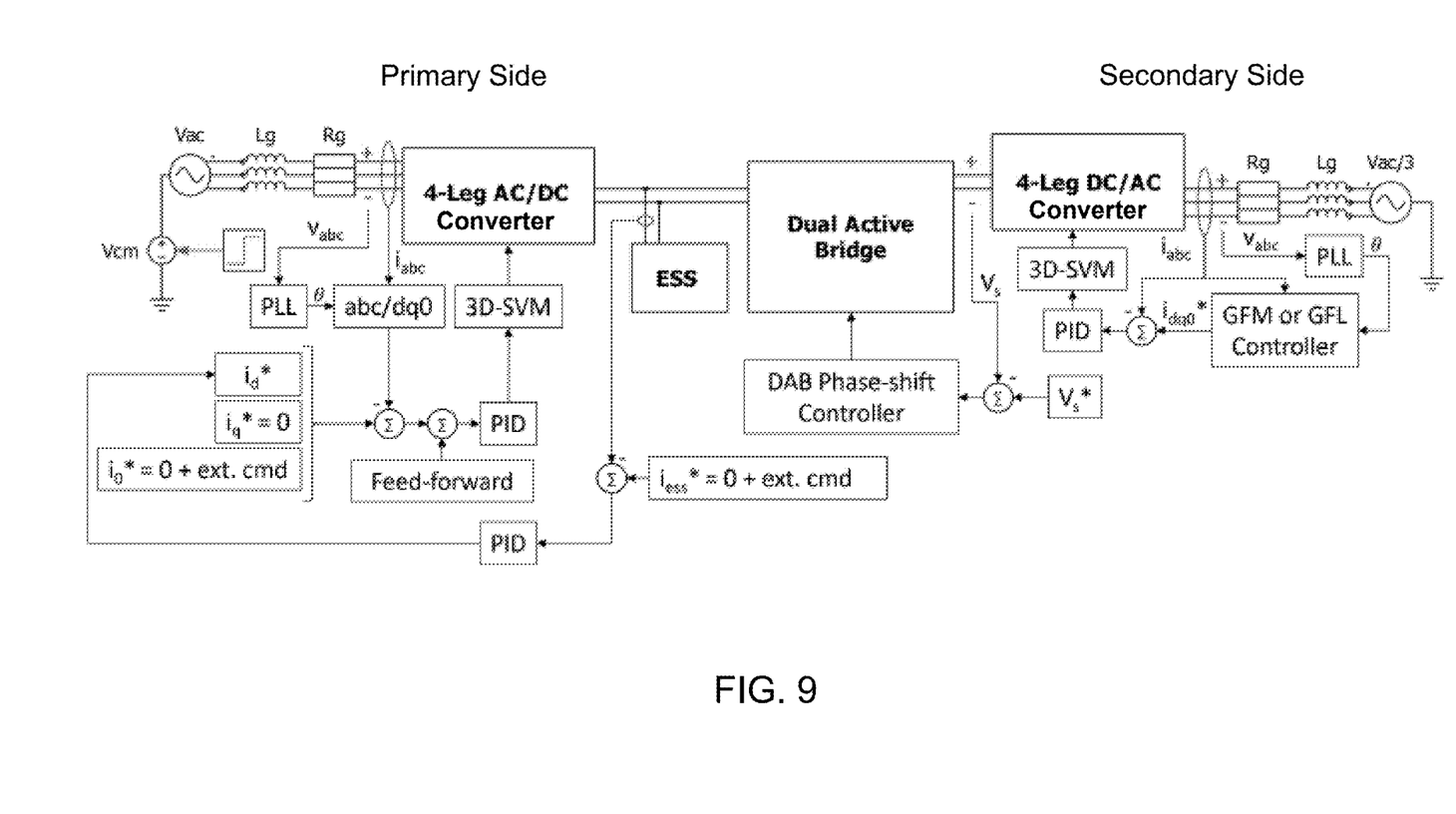
FIG. 9 is a circuit diagram of the SST, including a $V_{cm}$ insult used to simulate a hypothetical HEMP/GMD event.

A control block diagram for the overall SST is shown in FIG. 9. In this system, the primary and secondary grid angles are tracked by a phase-locked loop (PLL) which is used to convert all measured values into the synchronous dq0 reference frame. On the primary side, these values are compared to commanded values, $i^*_d$, $i^*_q$, and $i^*_0$ and combined with some feed-forward terms based on the dq0-axis grid voltages as the inputs to a Proportional+Integral+Derivative (PID) control loop. The d-axis current control term $i^*_d$ is found from another PID control loop and is configured to draw enough power into the SST to feed the downstream load and drive average power into the ESS to zero watts at steady state. Control term $i^*_q$ is set to zero to reduce reactive power contribution from the converter. Control term id is set either to 0, to drive common mode currents to 0 A, or to an externally determined value in cases where the system is diverting the common mode currents around more vulnerable components. The 3D-space vector pulse width modulation (3D-SVM) scheme described above is used to generate the switching signals for the four-leg ac/dc converter. The time constant for this control loop can be tuned to be larger than the RL time constant of the ESS so that during a transient, such as a CM insult, the ESS acts as the primary response mechanism Power is transferred from the grid-side to the load-side via the DAB. The DAB is controlled to maintain the secondary-side DC voltage $V_s$. As described above, a phase-shift PWM scheme can be used to control the DAB. The secondary-side dc/ac converter can be controlled in the same way as the primary-side ac/dc converter, or in a conventional mode that matches power output to the load. The load-side dc/ac converter can act as either a grid-forming (GFM) or grid-following (GFL) source.

Simulation Results

Figure 10A:
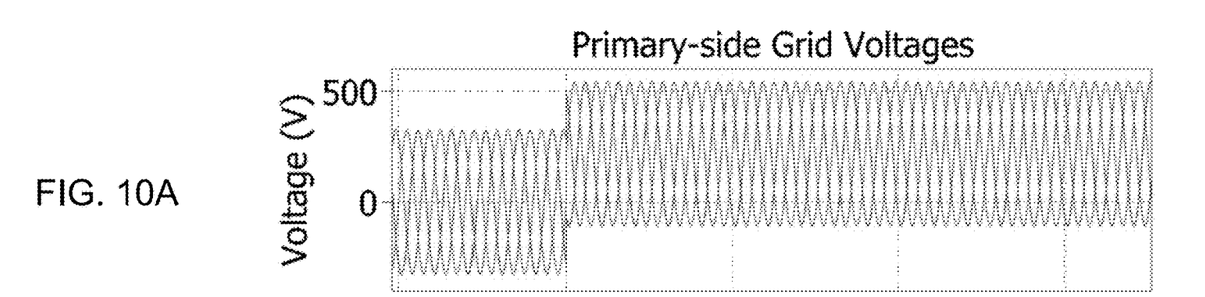
FIGS. 10A-10F are graphs illustrating the dynamic behavior of the SST in response to a CM voltage insult.
Figure 10B:
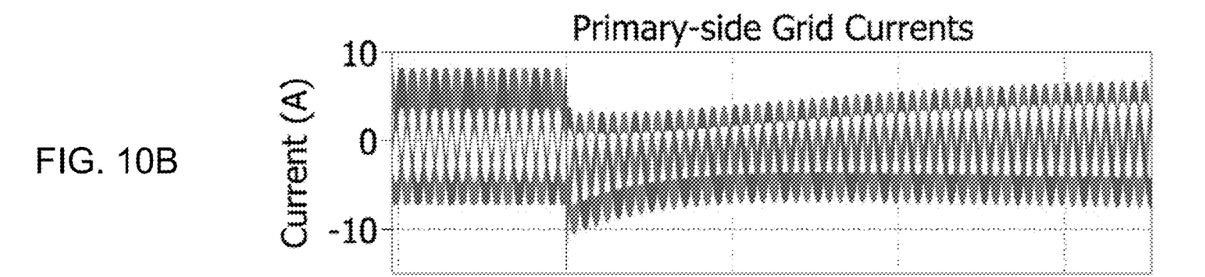
Figure 10C:
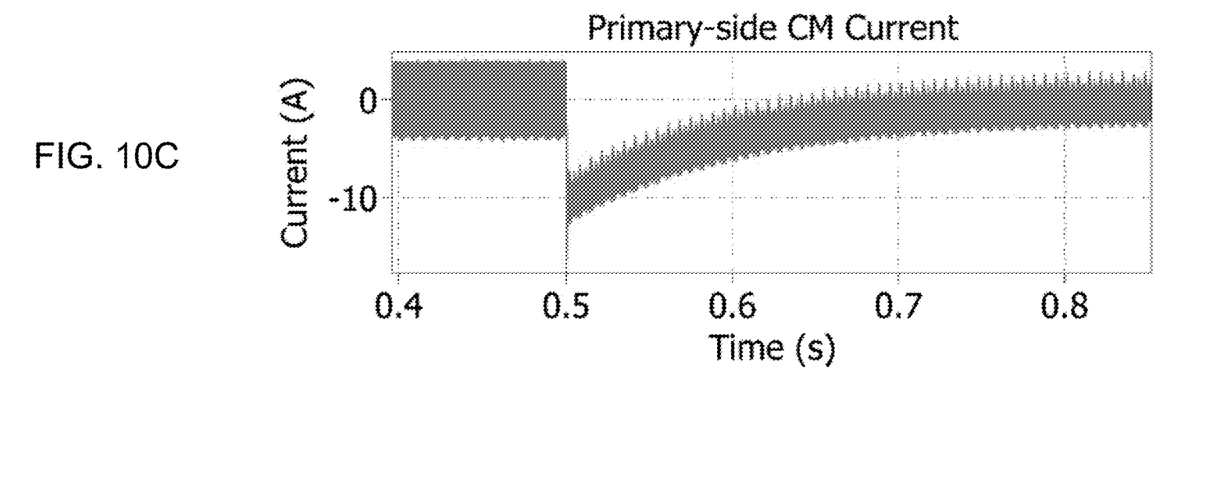
Figure 10D:
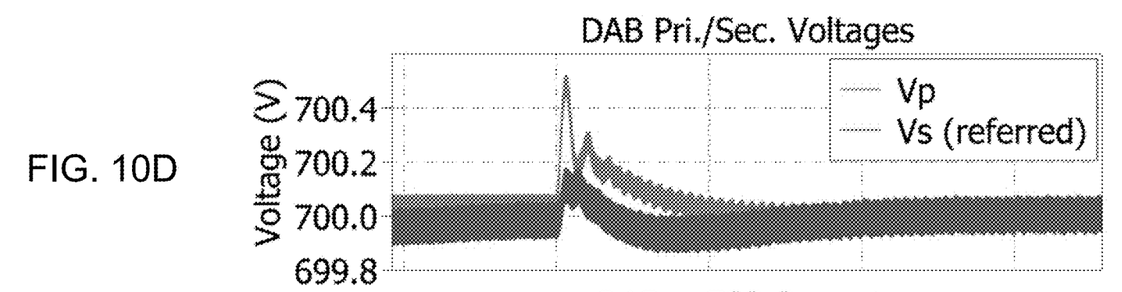
Figure 10E:
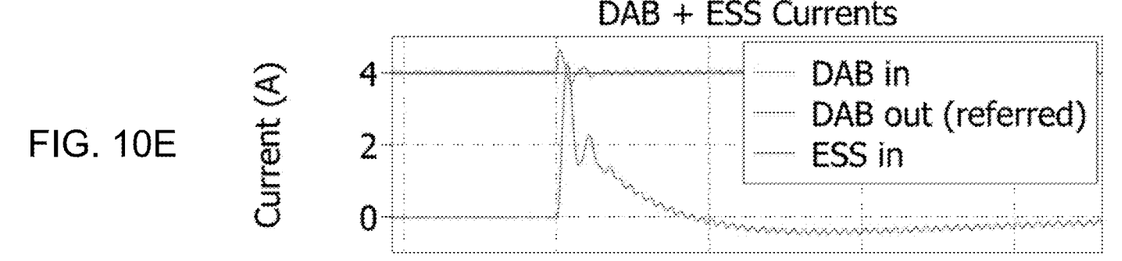
Figure 10F:
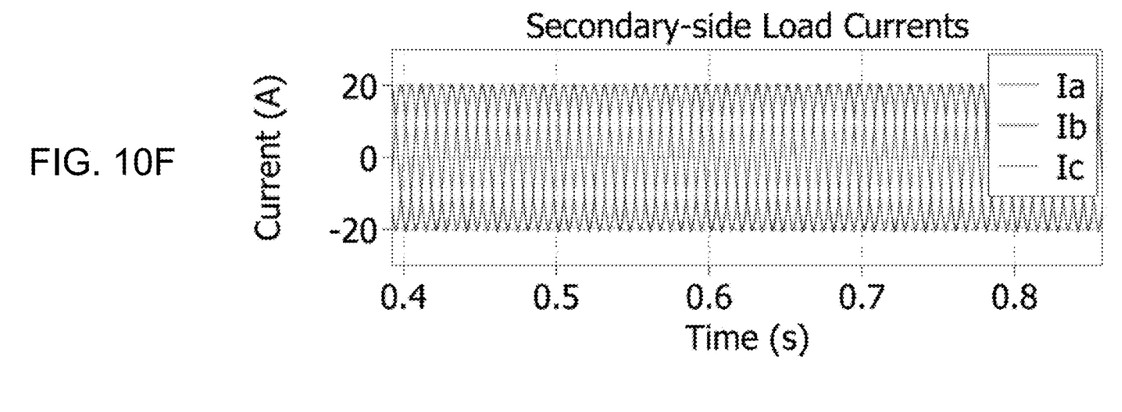

A simulation model of the SST was modeled in PLECs. See PLECs User Manual, Plexim GmbH, 2023. [Online]. Available: https://www.plexim.com/. The simulation was allowed to run for duration of 1 s, and a simulated CM insult on the primary side of the transformer occurs at t=0.5 s. The same grid parameters used for the conventional transformer simulation shown in FIG. 3 were used for the SST simulation. The results for a simulation study are shown in FIGS. 10A-10F. The three-phase ac grid voltage, grid current, and corresponding CM current on the primary side are shown in FIGS. 10A-10C. The dc voltages on both the primary and secondary sides of the DAB, the dc currents for the DAB and ESS, and secondary-side dc/ac converter output currents are shown in FIGS. 10D-10F.

As can be seen in FIGS. 10A-10C, when the CM voltage insult occurs the SST momentarily deviates from its steady-state operating condition. The CM current on the grid side immediately jumps to a negative value (FIG. 10C), and this causes the feedback control loop to increase the CM voltage output by the ac/dc converter and drive the CM current back to its reference value (0 A). During this time, a CM current is flowing into the CM voltage generated by the ac/dc converter, thus CM power is being absorbed by the SST. This can be confirmed by the corresponding increase in current into the ESS during this transient, which ultimately returns to zero as the CM current on the ac side returns to zero. In total, the ESS experiences a peak power flow of ~3 KW into the device, however since this power flow lasts for much less than 1/10th s, the total energy transfer is less than 100 J.

During the CM insult transient, the voltages on both the primary $V_p$ and secondary $V_s$ sides of the DAB are maintained within ~0.07% of its desired set-point, as shown in FIG. 10D. Furthermore, there is no evidence of the primary-side CM insult having any effect on the load-side behavior (FIG. 10F). Compared to conventional magnetic transformer, the SST responds much more desirably to a CM insult, with only a minor and transient impact on primary side currents, and no impact on the SST regarding input/output behavior.

The present invention has been described as a solid-state transformer for mitigation of common mode insults. It will be understood that the above description is merely illustrative of the applications of the principles of the present invention, the scope of which is to be determined by the claims viewed in light of the specification. Other variants and modifications of the invention will be apparent to those of skill in the art.

The invention claimed is:

1. A solid-state transformer for mitigation of common mode insults, comprising:
   a primary-side ac/dc converter on a grid side,
   an intermediate dc/dc converter electrically connected in series to an output of the primary-side ac/dc converter which provides galvanic isolation of the grid side and a load side, thereby enabling large step-up/step-down ratios,
   a secondary-side dc/ac converter electrically connected in series to an output of the intermediate dc/dc converter and configured to feed a downstream load,
   an energy storage system electrically connected in parallel to the output of the primary-side ac/dc converter and configured to absorb common mode energy incident on the grid side of the primary-side ac/dc converter, and
   a controller configured to divert the common mode energy to the energy storage system and output enough power from the primary-side ac/dc converter to ensure the secondary-side dc/ac converter outputs a constant current to a downstream load.

2. The solid-state transformer of claim 1, wherein the primary-side ac/dc converter comprises a four-leg ac/dc converter.

3. The solid-state transformer of claim 1, wherein the secondary-side dc/ac converter comprises a four-leg dc/ac converter.

4. The solid-state transformer of claim 1, wherein the intermediate dc/dc converter comprises a dual active bridge.

5. The solid-state transformer of claim 1, wherein the energy storage system comprises a battery, super capacitor, or flywheel.

* * * * *